United States Patent [19]

Gallagher et al.

[11] Patent Number: 5,389,263

[45] Date of Patent: Feb. 14, 1995

[54] GAS ANTI-SOLVENT RECRYSTALLIZATION AND APPLICATION FOR THE SEPARATION AND SUBSEQUENT PROCESSING OF RDX AND HMX

[75] Inventors: Paula M. Gallagher, Bradford; Val J. Krukonis, Lexington; Michael P. Coffey, Townsend, all of Mass.

[73] Assignee: Phasex Corporation, Lawrence, Mass.

[21] Appl. No.: 886,603

[22] Filed: May 20, 1992

[51] Int. Cl.⁶ .......................................... B01D 21/01
[52] U.S. Cl. ................................ 210/729; 210/703; 210/723; 210/634; 264/3.4; 149/124
[58] Field of Search ............... 210/634, 658, 703, 723, 210/729; 55/57; 149/109.6, 21, 124; 208/390; 554/83; 426/312; 264/3.4, 3.6, 3.2; 540/475; 562/402

[56] References Cited

U.S. PATENT DOCUMENTS

| | | | |
|---|---|---|---|
| 4,192,731 | 3/1980 | Stearns et al. | 208/390 |
| 4,263,253 | 4/1981 | Pilz et al. | 55/57 |
| 4,552,598 | 11/1985 | Lee et al. | 149/109.6 |
| 4,564,405 | 1/1986 | Dallanck | 149/21 |
| 4,582,731 | 4/1986 | Smith | 210/658 |
| 4,855,436 | 8/1989 | Riggs | 149/109.6 |
| 4,900,819 | 2/1990 | Ericsson et al. | 544/251 |
| 4,948,897 | 8/1990 | Riggs | 149/109.6 |
| 4,983,235 | 1/1991 | Nyqvist et al. | 149/109.6 |
| 4,994,124 | 2/1991 | Nguyen | 149/109.6 |
| 5,026,443 | 6/1991 | Müller et al. | 149/109.6 |
| 5,035,843 | 7/1991 | Schmid | 264/3.2 |
| 5,196,575 | 3/1993 | Sebastian | 562/402 |

FOREIGN PATENT DOCUMENTS

WO9003782  4/1990  WIPO.

*Primary Examiner*—Robert A. Dawson
*Assistant Examiner*—Ana Fortuna
*Attorney, Agent, or Firm*—Kane, Dalsimer, Sullivan, Kurucz, Levy, Eisele and Richard

[57] ABSTRACT

Disclosed is a process for recrystallizing materials that are ordinarily difficult-to-comminute. The process utilizes supercritical fluids and gasses at conditions near their respective vapor pressures which have the ability to dissolve in and expand liquid solutions. The process has been shown to be particularly effective at separating HMX and RDX thereby resulting in a precipitate of RDX which is essentially free of HMX.

36 Claims, 14 Drawing Sheets

1.25 cm = 200 μ

1.25 cm = 200μ

1.5 cm = 100 μ

1.4cm = 100μ

1.25cm = 100μ

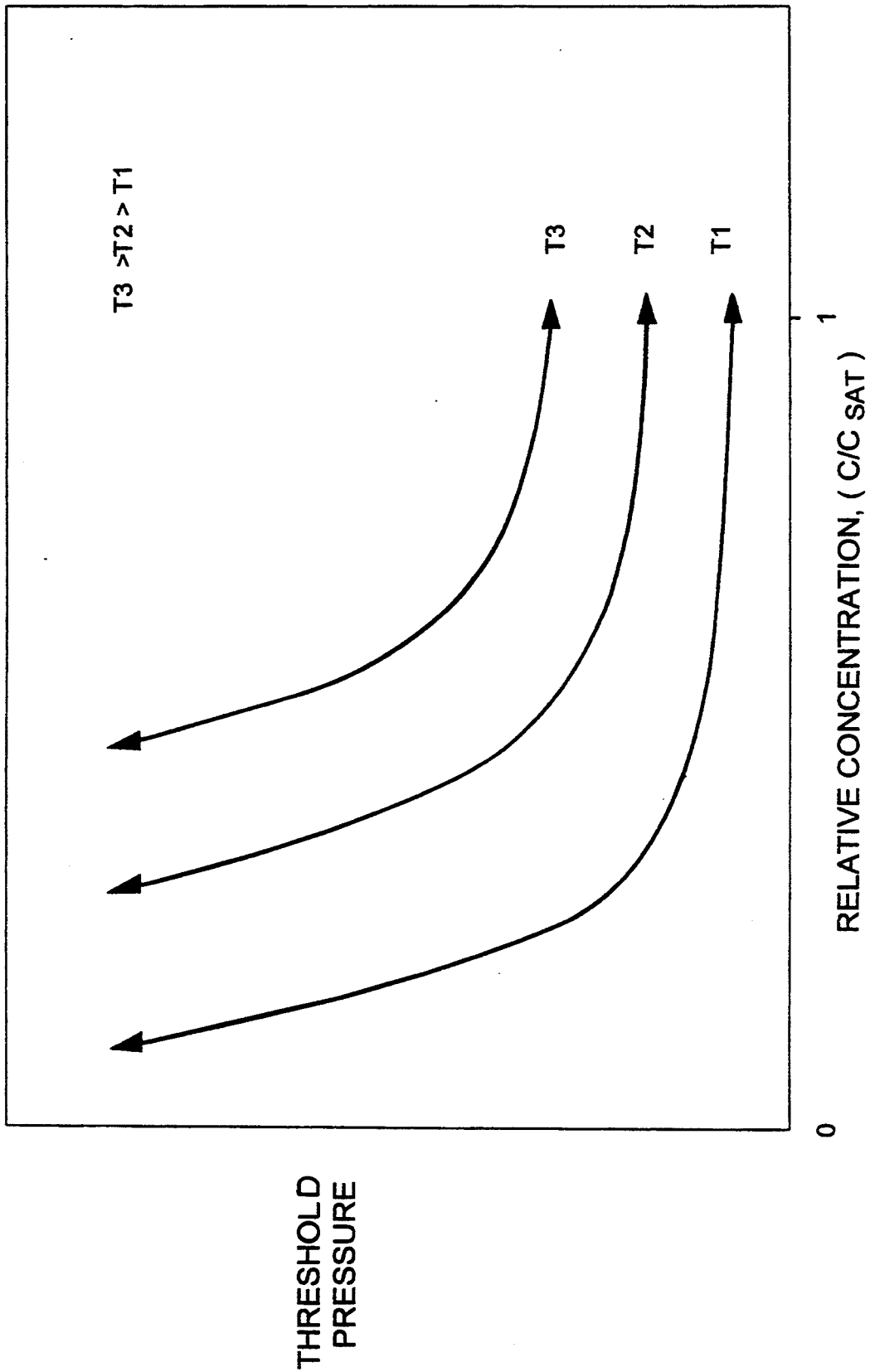

1.0 cm = 200 μ

1.0 cm = 200 μ

1.25 cm = 100μ

1.25cm = 100μ

GAS ANTI-SOLVENT RECRYSTALLIZATION AND APPLICATION FOR THE SEPARATION AND SUBSEQUENT PROCESSING OF RDX AND HMX

BACKGROUND OF THE INVENTION

Gas Anti-Solvent (GAS) Recrystallization is a recently developed process for recrystallizing materials that are ordinarily difficult-to-comminute. Supercritical fluids (SCF) and additionally gases at conditions near their respective vapor pressures (hence the term GAS) have the ability to dissolve in and expand liquid solutions. GAS Recrystallization exploits this property by using gases or SCFs as anti-solvents for inducing nucleation of a dissolved solid from an organic solution.

RDX (cyclotrimethylenetrinitramine) and HMX (cyclotetramethylenetetranitramine) are energetic materials which are used in explosive and propellant formulations. It is difficult to process these materials by current methods not only because of their sensitivity but also because conventional techniques for recrystallization do not always form crystals of desirable size, size distribution, shape, or morphology. Previous research has shown that GAS Recrystallization can successfully recrystallize RDX, forming particles of desirable characteristics. HMX is a byproduct of RDX production and its presence can significantly effect further RDX processing, and therefore, it would be advantageous to be able to separate these two materials. The GAS process can be tailored so as to selectively precipitate the RDX thereby forming an essentially HMX-free product. Subsequent processing of the spent solution may allow one to recover the HMX, itself a high value product.

Current manufacture of RDX and HMX utilizes processes that were developed decades ago. The Bachmann process for RDX production[1] results in the formation of a by-product, HMX, which is present in the product from 2 to 20 wt %. The structures of RDX and HMX are:

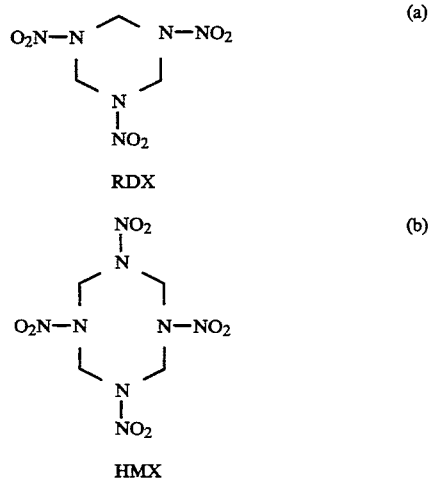

Besides by-product formation, a major drawback of the conventional manufacturing techniques for RDX is that the product is generally not of a desirable crystal size, size distribution, shape, or morphology, and further recrystallization is necessary; pure forms of both RDX and HMX can be recrystallized by thermally induced precipitation from a solvent, but the presence of impurities can have a significant effect on the resultant crystals.

While RDX shows no evidence of room temperature stable polymorphism it can exist in many different crystal habits. HMX, on the other hand, exists in four polymorphs ($\alpha$, $\beta$, $\gamma$, $\delta$), each having different stability ranges and physical properties. In order to obtain one form exclusive of the others by current recrystallization techniques one must precisely control the temperature, the cooling rate, and the degree of agitation. To complicate matters further, the HMX polymorphs can undergo transformations which can be influenced not only by the "environmental" conditions during recrystallization but also by the presence of RDX. It is speculated that, likewise, the presence of HMX can influence RDX recrystallization and may possibly contribute to the formation of voids during RDX crystal growth. FIG. 1 shows a typical sample of as-produced RDX; the dark spots are large, intragranular cavities made visible using refractive index matching fluid. (In an aside, HMX-free RDX has been produced in laboratory quantity[2], but the recrystallized material does contain intragranular cavities.) These flaws in crystal struture can adversely affect the performance of the overall explosive or propellant formulations. However, recent developments have indicated that while small amounts of HMX in the RDX can be undesirable, high HMX-content RDX (greater than 30 wt % HMX) may be a potentially new, highly energetic combined product explosive (CPX)[3].

Supercritical fluids have been investigated as solvents for extraction, purification, and recrystallization based on their pressure-dependent dissolving properties. For the past few years Phasex has been developing a process, called Gas Anti-Solvent (GAS) Recrystallization, for processing "sensitive" materials such as pharmaceuticals and explosives. Application of the process to the recrystallization of nitroguanidine (NQ)[4], RDX[5], and other materials[6] has been described elsewhere but a brief review is given here in order to clarify further discussion. Since they are generally miscible with many organic liquids, supercritical fluids and even gases can be effective anti-solvents for recrystallization of materials that are insoluble in "simple" supercritical fluids. Introduction of the gas into an organic solvent results in an expansion of the liquid phase as more of the gas is dissolved into the liquid. The expansion curves for neat acetone/$CO_2$ system shown in FIG. 2 depict the miscibility characteristics between the solvent and anti-solvent; although the absolute numbers are different, the same general trend arises with many solvent/gas anti-solvent pairs. If a solution of organic solvent plus dissolved solid is expanded in a similar manner, supersaturation in the solution is created. At some point, a "critical" supersaturation level is exceeded and the solid precipitates. By varying the operating conditions including temperature, pressure, and initial solution concentration, as well as other variables such as the solvent itself and the rate of anti-solvent addition, one can produce a variety of crystal sizes, size distributions, and habits. FIGS. 3, 4, and 5 show select samples that were produced on an initial Ballistic Research Laboratory-funded program (cf. ref. 5); nearly all the crystals formed were essentially void-free as determined by optical microscopy using refractive index matching fluid.

Recent interest has focused on using GAS Recrystallization not only for producing void-free RDX but also for separating RDX and HMX. The GAS process has the potential for achieving this separation based on a trend exhibited by all of the various systems tested at Phasex: more dilute solutions require higher levels of expansion (and correspondingly higher pressures) before the "onset of nucleation" occurs. FIG. 6 depicts this general relation between initial solution concentration and expansion required for nucleation; the pressure at which the onset of visible nucleation occurs has been termed threshold pressure (THP), and predetermined expansion curves (for example, FIG. 2) permit direct correlation between expansion levels and pressure.

Therefore, if a solvent which dissolves both RDX and HMX to about the same weight percent (assuming the maximum of 20% HMX in the RDX and that the solution is significantly less saturated in HMX than RDX) is chosen, it is possible to recover RDX in a "first" expansion, then to recover HMX (or at least a CPX) in a "second" higher level expansion. One might ask, "Why not just choose a solvent which can dissolve the RDX and not HMX and then just filter out the HMX?". RDX and HMX are very close in chemical structure and the two tend to strongly "associate" with one another making separation by this method nearly impossible.

Evaluating suitable solvents is more complex than simply looking at their ability to dissolve the solid RDX/HMX mixture; the crystal habit and morphology of the recrystallized material must be of a desirable, void-free form. There should be no chemical reaction or complex formation as is the case with HMX and dimethyl formamide, for example. Also, at least partial miscibility between the solvent and gas anti-solvent must exist. For this study, several solvents were evaluated but for brevity, only the most promising will be discussed further.

SUMMARY OF THE INVENTION

Disclosed is a process for separating mixtures of crystalline solids which comprises:
1. Dissolving the solid mixture to be separated in a liquid solvent.
2. Adding to the solution of liquid solvent plus dissolved solid, a volume of gas or supercritical fluid anti-solvent sufficient for inducing precipitation of only one component of the mixture.
3. Collection of the precipitated solid by passing the solution, now depleted in the one component, and anti-solvent through a filter.
4. Adding to the liquid solution, now depleted in the one component, a volume of gas or supercritical fluid anti-solvent sufficient for inducing precipitation of a second component.
5. Repetition of Steps (3) and (4) until liquid solution is depleted of dissolved solids.

This invention relates to processes for separating mixtures of crystalline solids such as explosives, pharmaceuticals, or dyes which are normally difficult to separate by conventional means such as filtration, extraction, or distillation. Specifically, this invention provides a process for separating mixtures of crystalline solids using a gas anti-solvent recrystallization method which method (as applies to recrystallization only) was described in a previous patent application, this invention is for purification.

The gas anti-solvent recrystallization method involves the use of a gaseous, near-critical, or supercritical fluid anti-solvent for inducing precipitation of a dissolved solid from a liquid solvent. The criteria for utilizing this technique are the following:
(1) The solid is essentially insoluble in the anti-solvent.
(2) The solid is reasonably soluble in the liquid solvent ($> \sim 1$ wt %).
(3) The liquid solvent and anti-solvent are at least partially miscible.

However, it is not obvious from the description of this technique that mixtures of crystalline solids can be separated and purified using gas anti-solvent recrystallization especially if the individual solids in the mixture have similar solubilities in a common solvent. Judicious choice of the solvent/anti-solvent pair, depending on the solid mixture, is essential to the operation of this process. Furthermore, depending on the relative proportions of the solids in the mixture, the solvent must be chosen such that the entire solid mixture dissolves. It is therefore necessary to choose a liquid solvent in which the individual solids in the mixture either have similar or dissimilar solubilities depending upon the relative proportion of the solid components in the mixture.

The objective of this study is two-fold:
1. To form large ($\sim 200\mu$) void-free particles of RDX.
2. To separate RDX and HMX.

BRIEF DESCRIPTION OF DRAWINGS

FIG. 6 shows a general expansion concentration relation.

DETAILED DESCRIPTION

Figure 12:

FIG. 12 shows RDX crystals formed from "first stage" expansion of an RDX/DMSO solution (HMX content is negligible).

Figure 13:
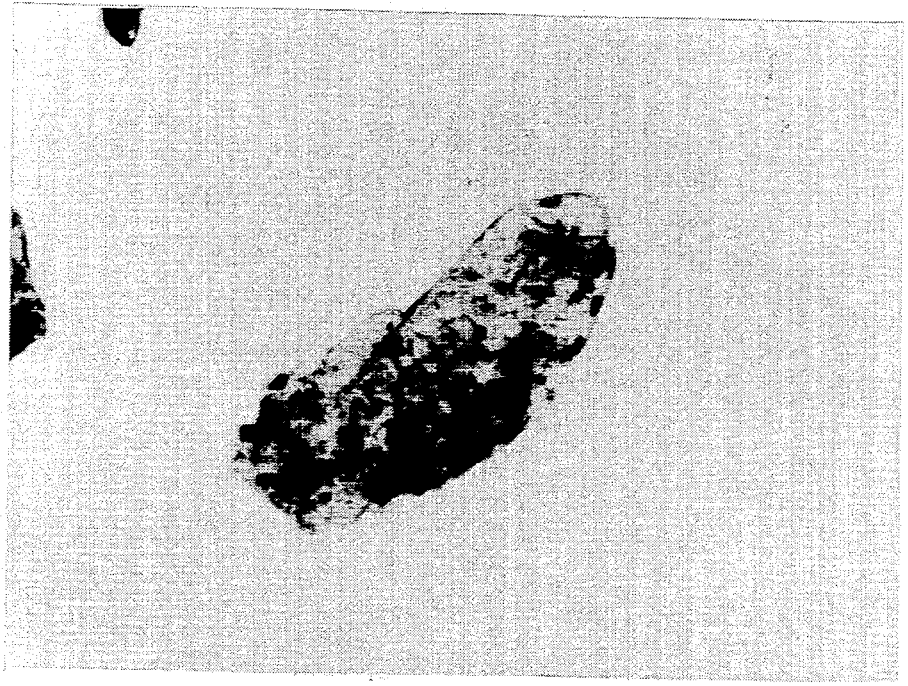

FIG. 13 shows RDX plates formed by rapid expansion of spent RDX/ -butyrolactone solution (HMX content is 8.60% by weight).

The first objective was achieved during an earlier program in which acetone was used as the solvent (cf. FIG. 5) and $CO_2$ as the anti-solvent. However, the solubility of HMX in acetone is much lower than that of RDX (for example, at 50° C., 10.7% RDX vs 2.8% HMX) and the ability to separate and recover the HMX is small when the HMX content of the original RDX is greater than about 10wt %. (As will be discussed later, the samples that were received for testing contained much lower amounts of HMX and, therefore, acetone was found to be satisfactory for producing HMX-free RDX.) Recall that the average HMX content in the RDX is on the average ~10 wt %, so that if the solution in acetone is saturated in RDX it will also be nearly saturated in HMX, and the expansion level (or THP) necessary for RDX would result in the recrystallization of HMX.

The ability to separate the two material, however, is based on the assumption that the expansion-concentration relations for HMX and RDX are similar. Consider the four scenarios depicted in FIG. 7.

Figure 7A:
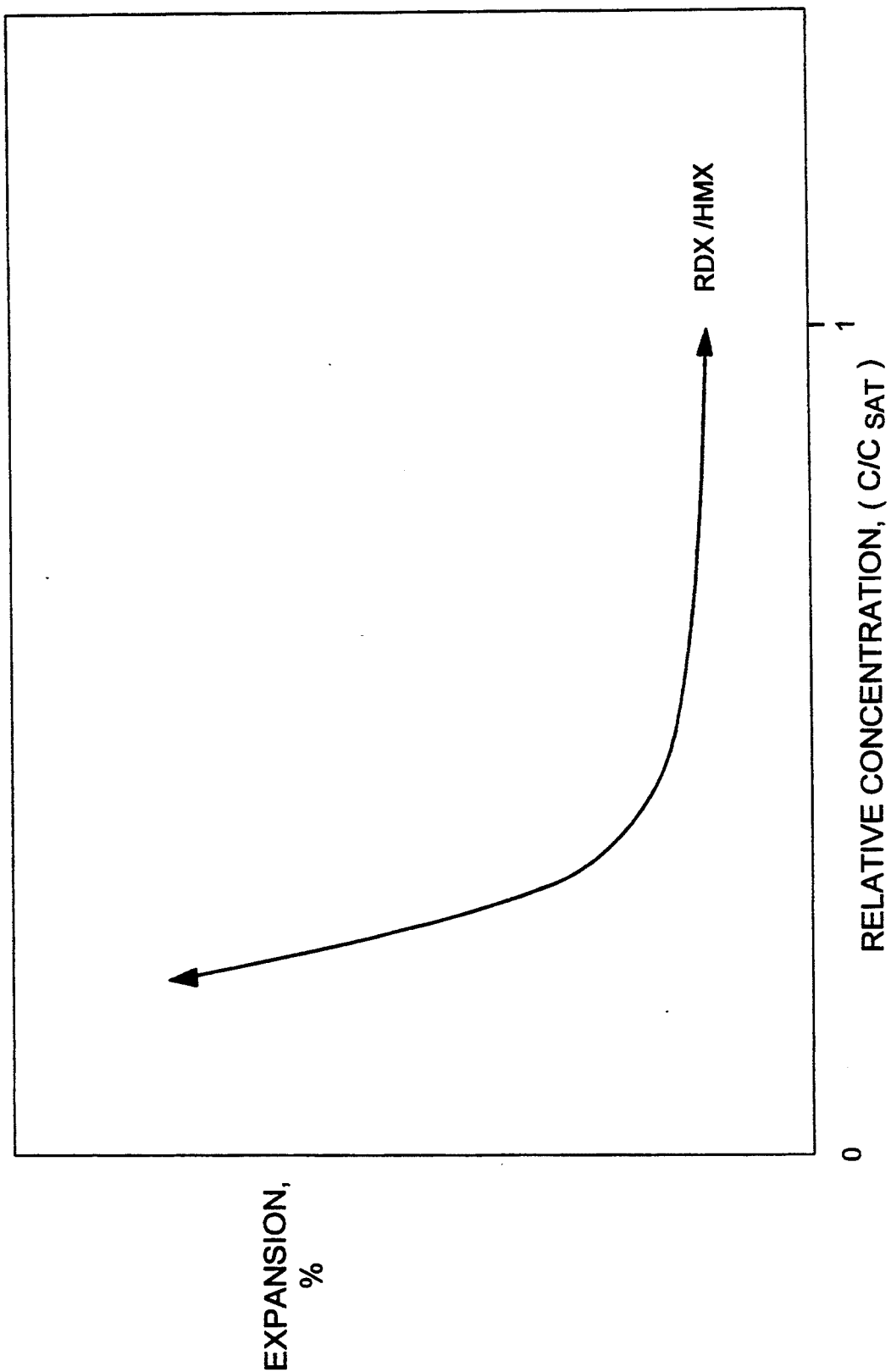
FIG. 7(a), 7(b), 7(c), and 7(d), represent four possible cases for expansion concentration relations of RDX compared to HMX.

The pressure required for "onset of nucleation" (THP) of RDX from several solvents has been measured as a function of concentration. However, THP values for pure HMX has not been determined for one reason: HMX is an extremely high energy explosive and is very dangerous to work with without the proper explosion-proof equipment. Because of the similarity in chemical nature of RDX and HMX, it has been assumed that the situation as depicted in FIG. 7a exists.

Figure 7B:
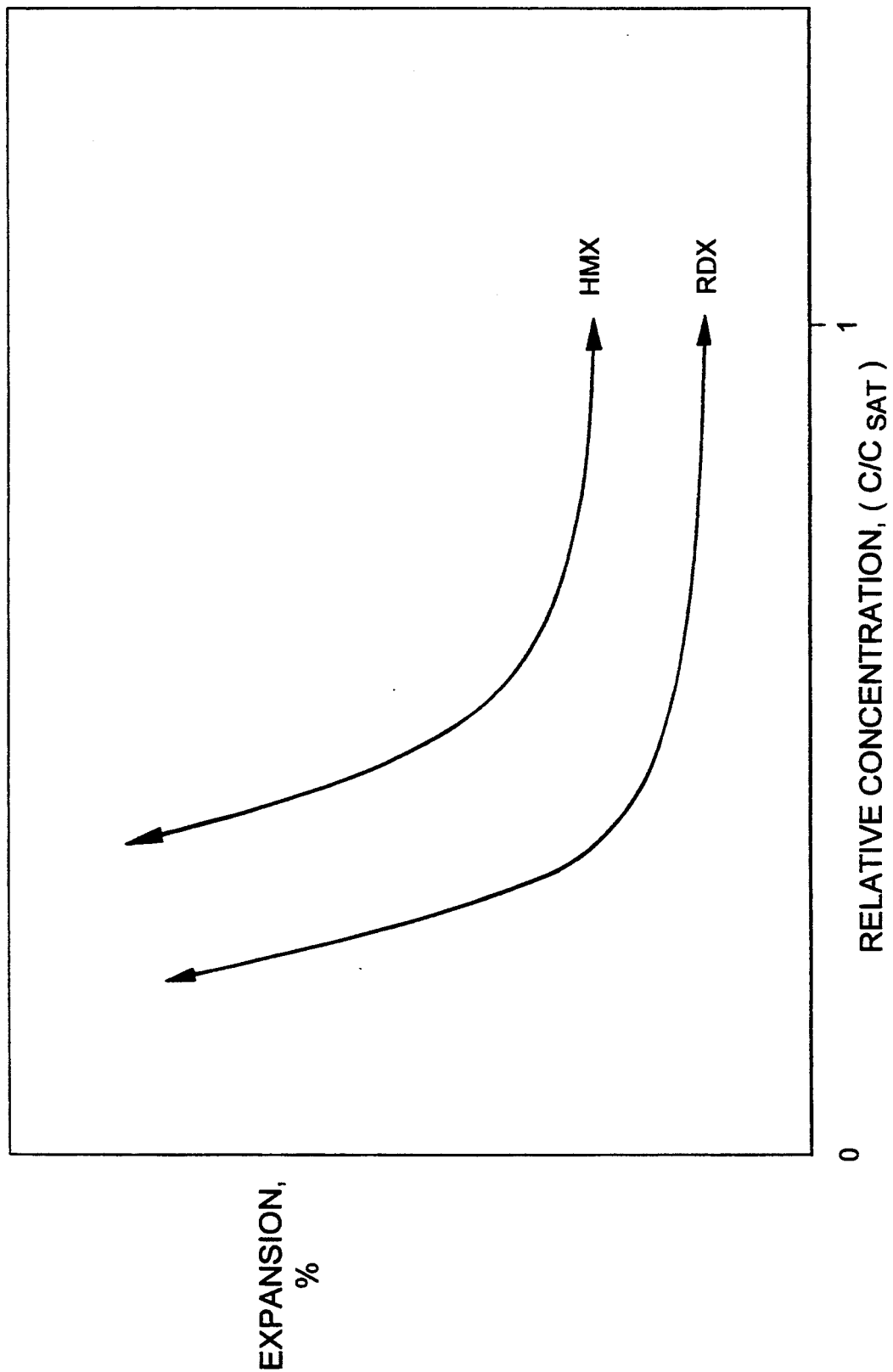
Figure 7C:
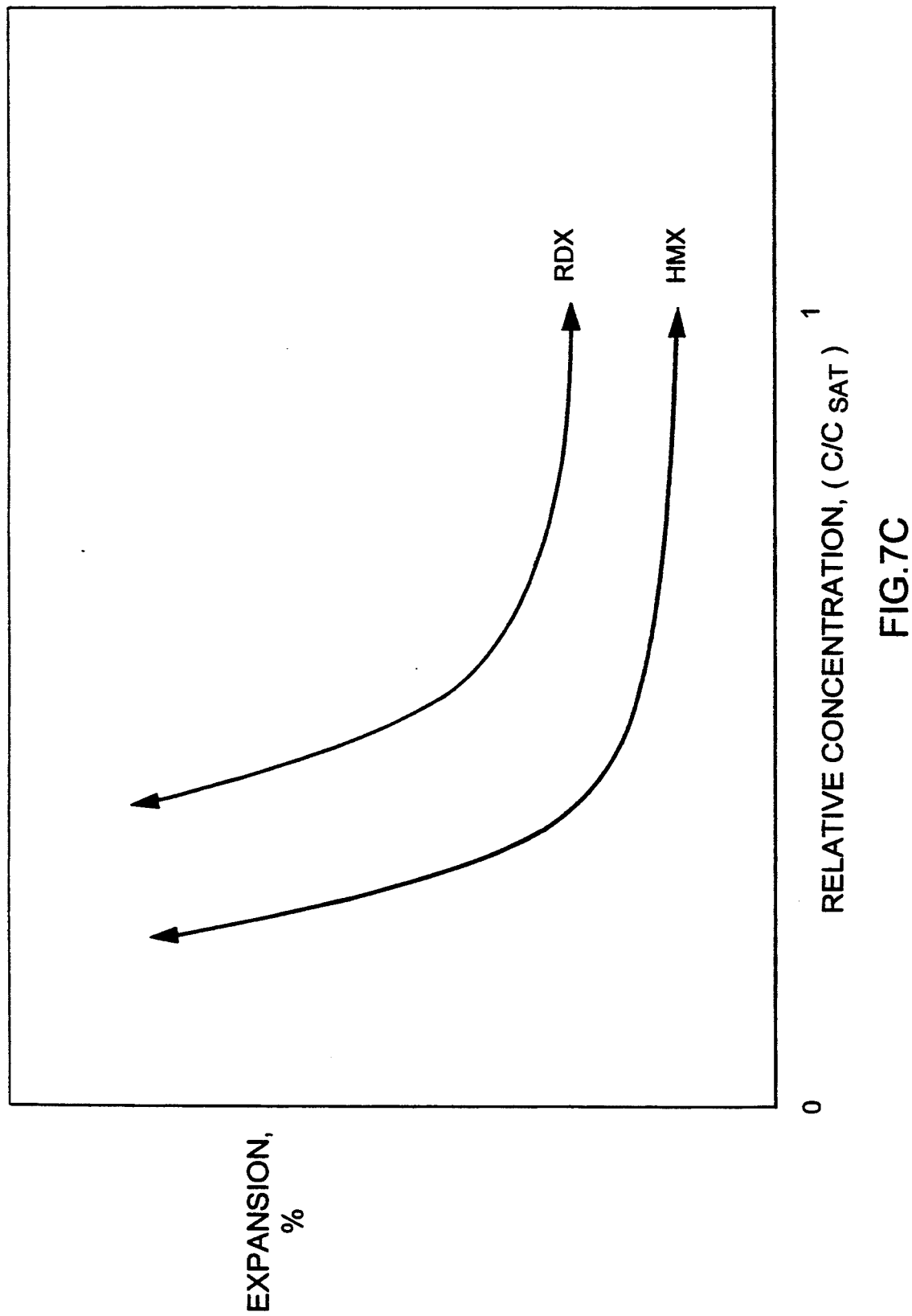
Figure 7D:
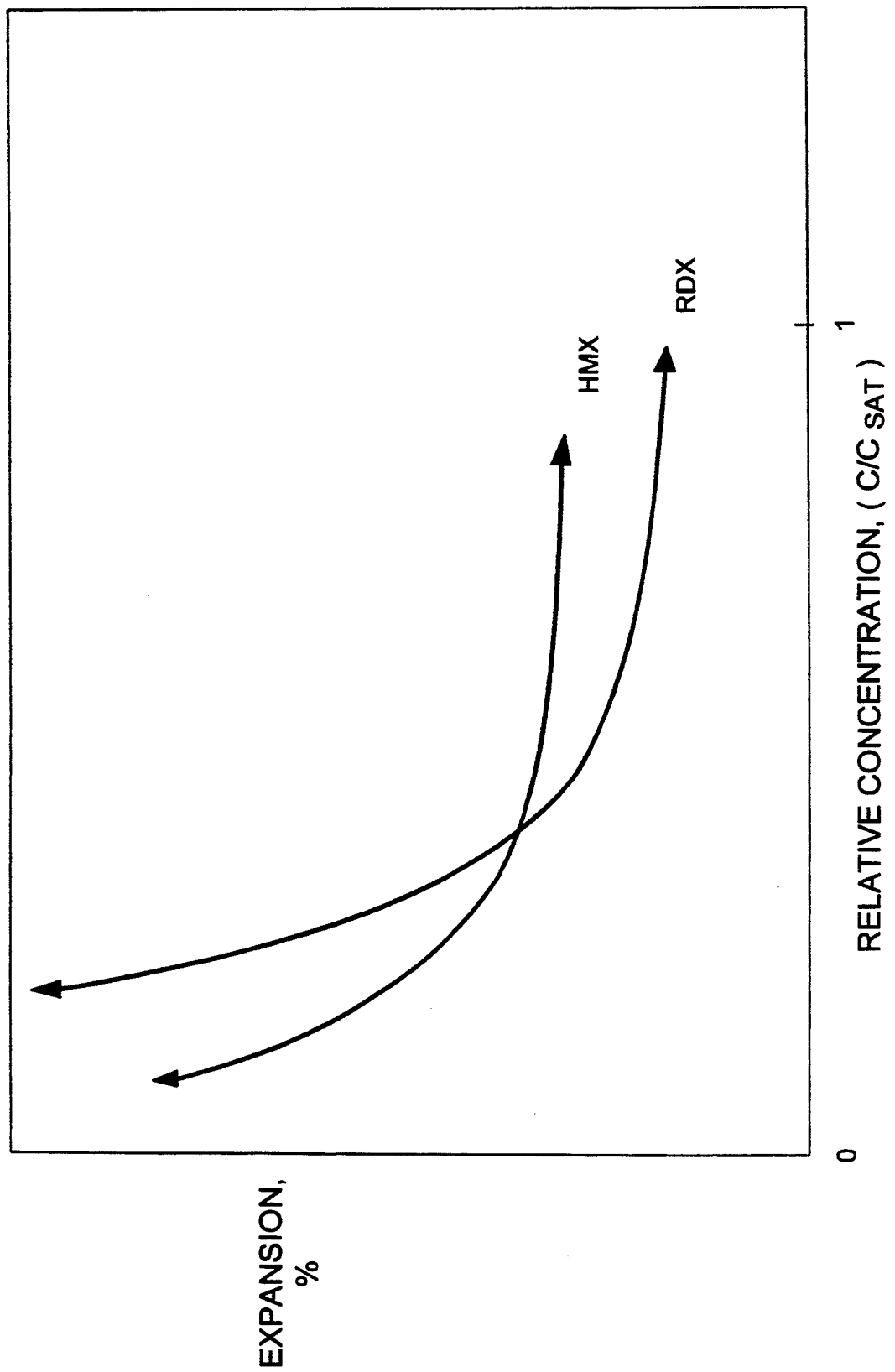

For the behavior shown in FIG. 7b, the possibility of separating RDX and HMX is quite high, and, additionally, for both cases 7a and 7b, the solutions being much less saturated in HMX than in RDX would increase the chances for clean separation. However, FIGS. 7c and 7d would represent situations where complete separation would be nearly impossible. If the relation for HMX is indeed as depicted in these two figures, clean separation might not be possible, but CPX formation is a viable expectation. The results will show that FIG. 7c probably does not describe the existing system for the solvents studied.

It would, therefore, be advantageous to use a solvent which can dissolve both compounds to a high enough level so that the actual concentration of HMX would be far enough away from its saturation level in order to prevent precipitation of HMX. Dimethyl sulfoxide (DMSO) and $\gamma$-Butyrolactone ($\gamma$-BL) possess the ability to dissolve both RDX and HMX to relatively high concentrations. Table 1 gives the solubilities of the neat compounds at 25° C. in these two solvents.

TABLE 1

| Solvents | Solubility of RDX and HMX | |
|---|---|---|
| | RDX (wt %) | HMX (wt %) |
| Acetone (50° C.) | 10.7 | 2.8 |
| $\gamma$-BL | 14.1 | 18.6 |
| DMSO | 41.8 | 21.5 |

Figure 1:
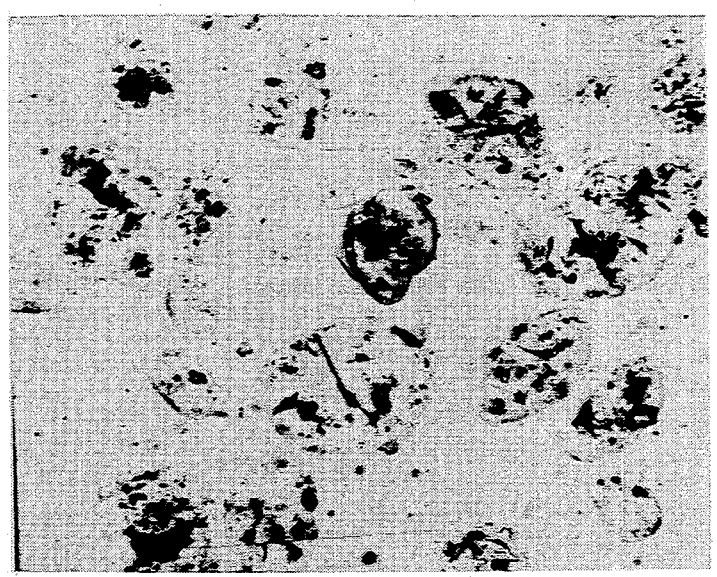
FIG. 1 shows a micrograph of RDX as produced at Houston Army Ammunitions Plant; HMX content is 3.16%.
Figure 2:
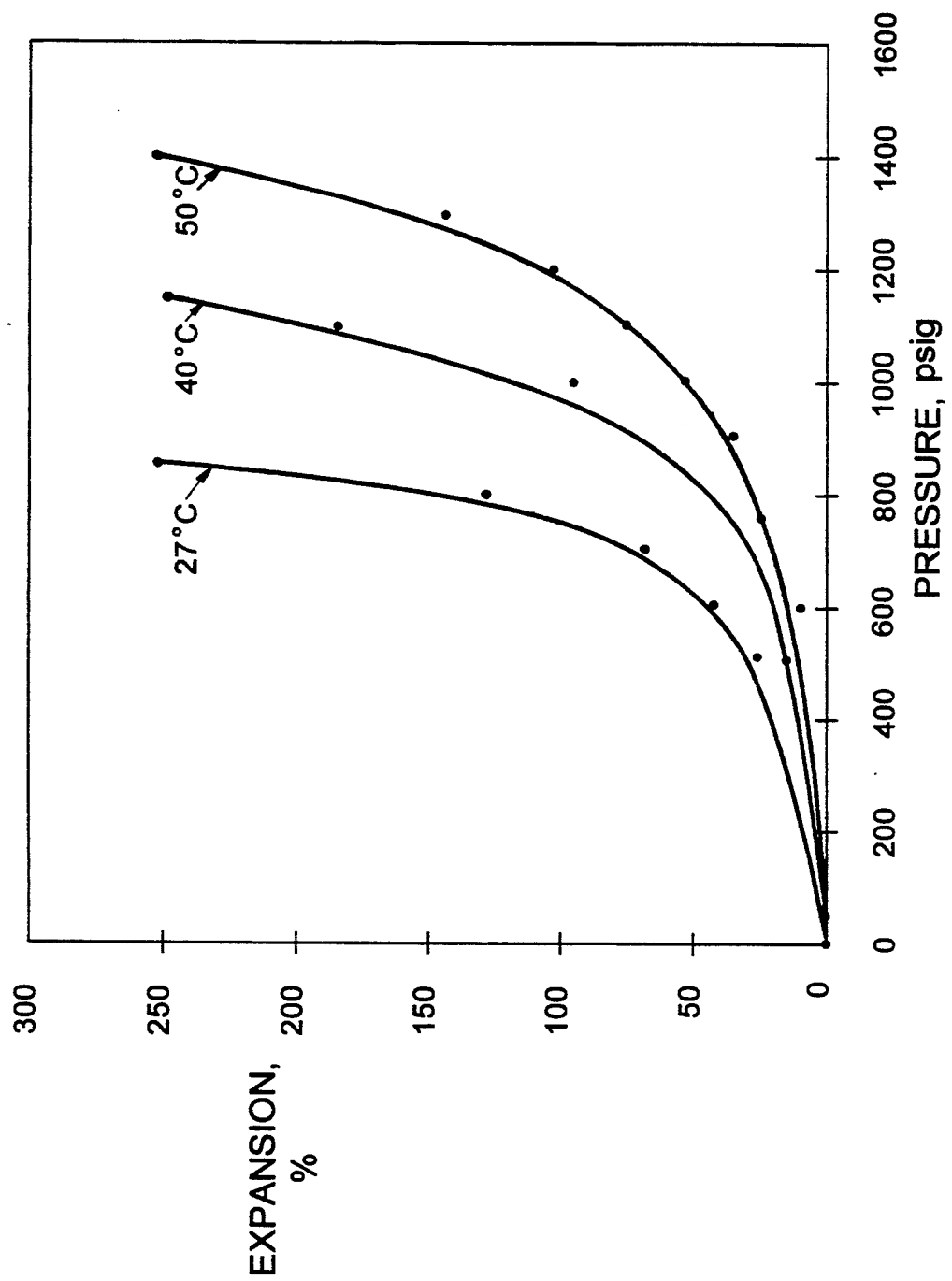
FIG. 2 shows volumetric curves of acetone by carbon dioxide.
Figure 3:
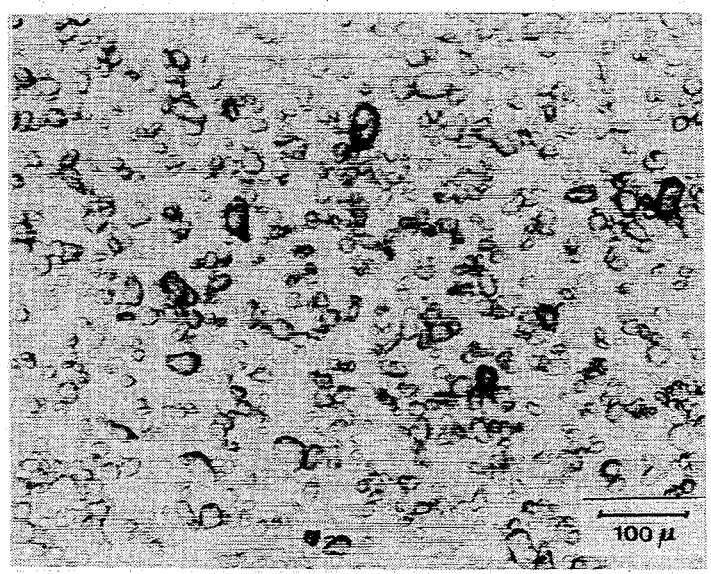
FIG. 3 shows a micrograph of gas recrystallized RDX from cyclohexanone solution.
Figure 4:
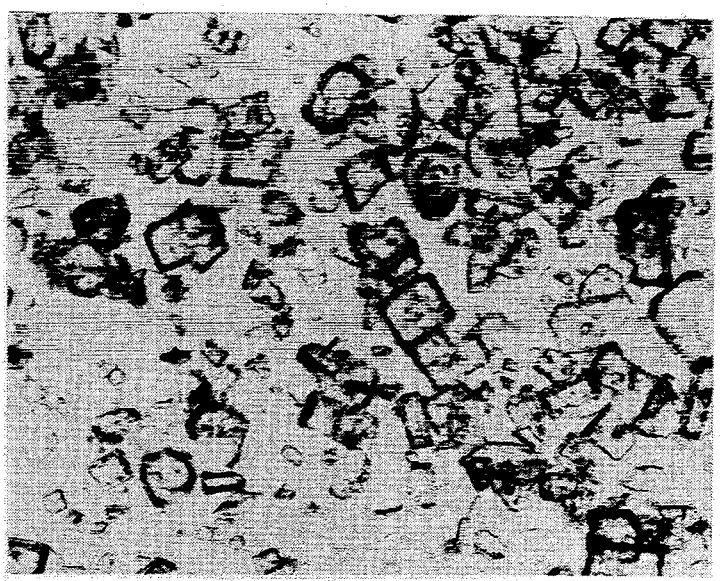
FIG. 4 shows the a micrograph of gas recrystallized RDX from cyclohexanone solution.
Figure 8:
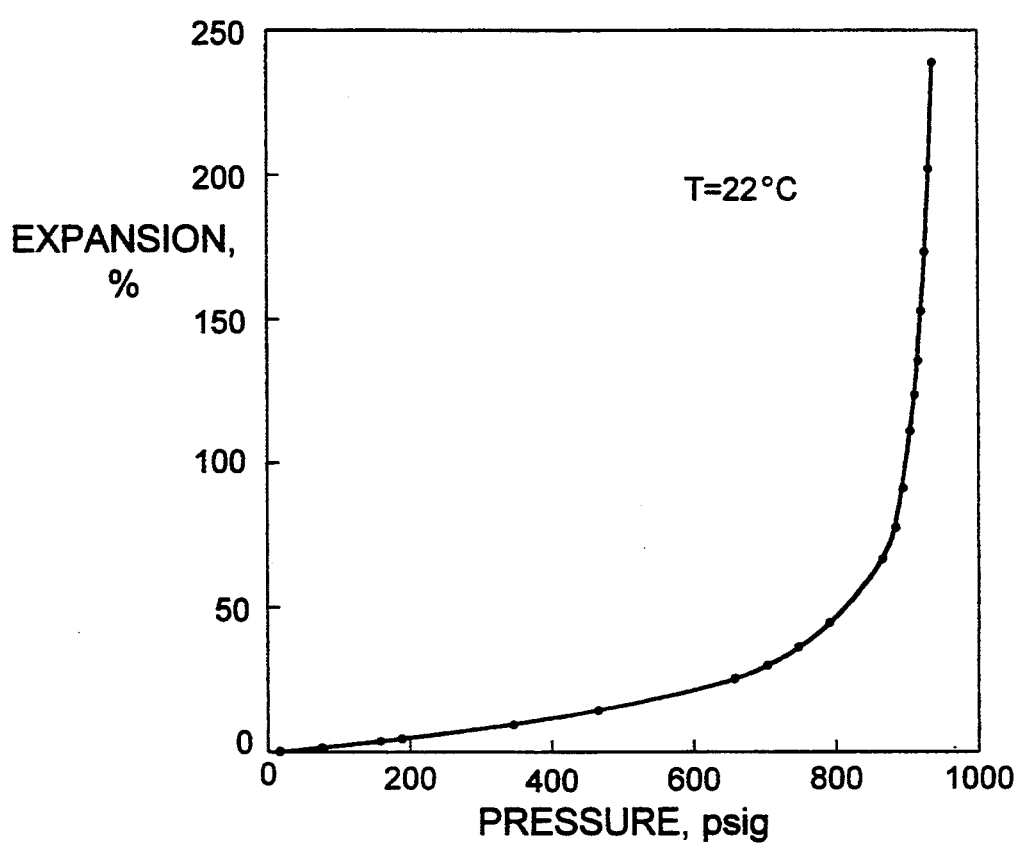
FIG. 8 shows a expansion curve for -Butirolactone/-CO2 at 22° C.

FIG. 8 shows the volumetric expansion curve for $\gamma$-Butyrolactone/$CO_2$ at 22° C. note the similarity to FIG. 2.

This curve demonstrates the miscibility of the neat solvent and anti-solvent pair thereby satisfying a major criterion for using the GAS Recrystallization process. (Another criterion, that the solid, i.e., RDX or HMX, be insoluble in the anti-solvent, $CO_2$, is also satisfied). Although the expansion curve for DMSO is not shown, it too displays similar miscibility behavior.

Figure 9:
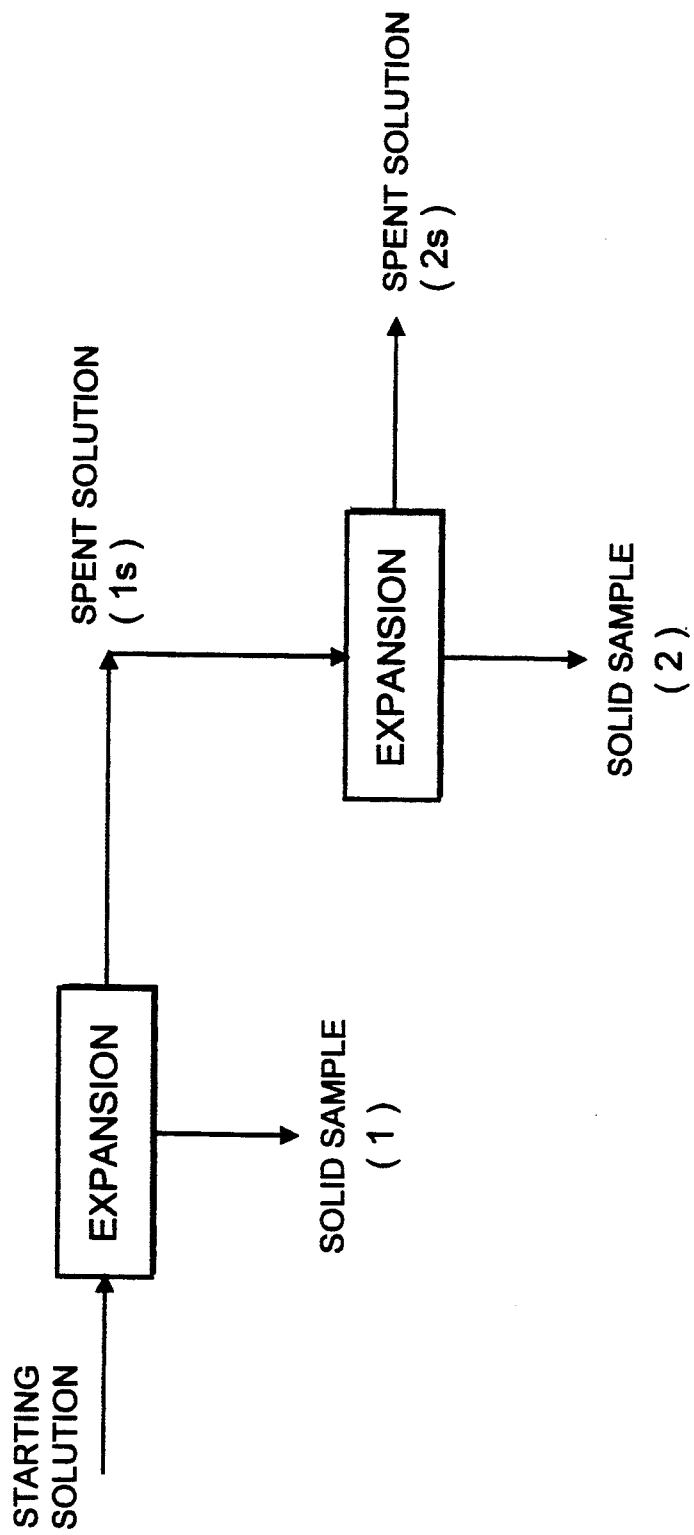
FIG. 9 shows a diagram of a two-stage gas recrystallization scheme.

In order to avoid any premature precipitation of RDX due to temperature changes, a solution slightly below RDX saturation (at 22° C.) was prepared and was charged to the vessel. The vessel was sealed and gas anti-solvent was slowly introduced; this vessel has a borosilicate glass window so that the recrystallization can be observed. Once visible nucleation occurs, (i.e., at THP), anti-solvent addition is terminated, and the particles are allowed to grow (recall that one objective is to produce large particles of RDX). After a hold time of 30–60 minutes the solution is drained and the particles are captured on a cotton filter. The spent solution is then used for a second expansion test where the anti-solvent is rapidly introduced and expands the solution to an even higher level. In order to more completely determine the ability to cleanly separate RDX and HMX, multiple expansion stages would be required, however. For this early test series small volumes (~20 ml) of solution were used making it difficult to expand more than twice, therefore, the second expansion is fairly rapid in order to deplete the solution of dissolved solid. FIG. 9 gives a very general schematic of this two-step process.

RESULTS

Although it was mentioned previously that RDX on average contains ~10% HMX by weight, the control sample of RDX that was received from Ballistic Research Laboratory actually contained only 3.16 wt % HMX. At this low level, it was possible to produce essentially HMX-free RDX from acetone in the first stage expansion. However, recovering pure HMX at a later stage would be very difficult since the spent solution is so dilute in HMX that the excessive expansion levels required for nucleation would also precipitate the remaining RDX. (~60% of the RDX is recovered in the first step.) Table 2 shows the results of two of the acetone tests where only a one stage expansion was performed.

TABLE 2

| HMX Content of Solid RDX Samples | |
|---|---|
| Sample | Wt % HMX |
| Control | 3.16 |
| 1 | 0.31 |
| 2 | 0.54 |

Figure 5:
FIG. 5 shows a gas recrystallized RDX from acetone solution.
Figure 10:
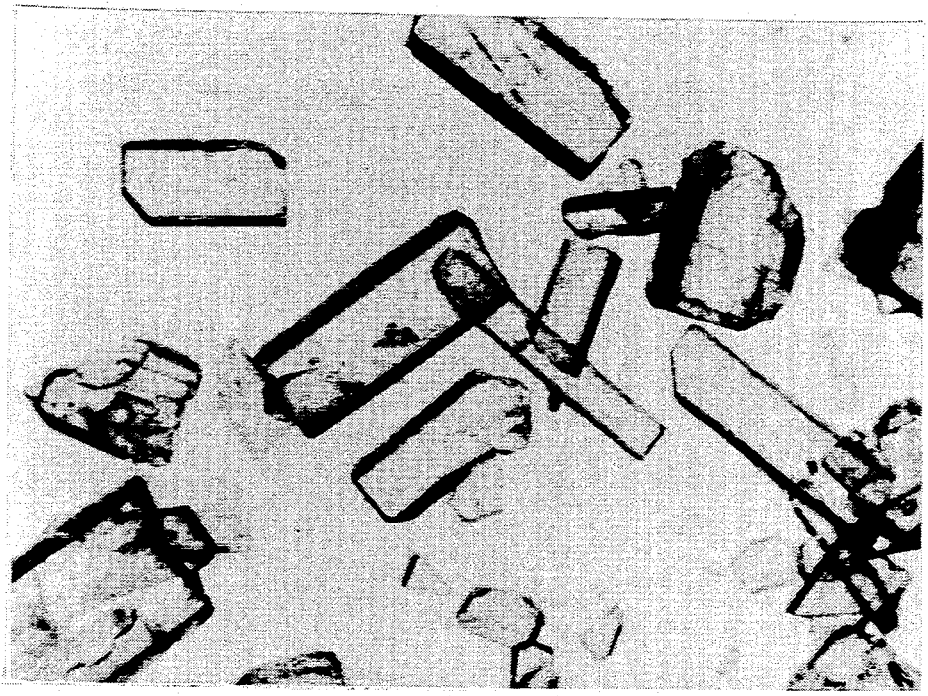
FIG. 10 shows a gas recrystallized RDX from acetone solution.

These values indicate that the RDX crystals obtained from a single expansion have been reduced in HMX content nearly 10-fold. The spent solutions have higher HMX to RDX ratios, and overall, the % RDX in solution has been dramatically reduced. Referring to FIG. 5, it can be seen that the more dilute the starting solution (for example, in RDX), the higher the threshold pressure (or greater expansion level) is required for nucleation. Simultaneously, the more near saturation the solution is (for example, in HMX) the lower the expansion level is required for nucleation. These two competing factors, especially for the case of acetone where the solubility of HMX is relatively low, make it difficult to separate RDX and HMX any further by this technique. The important result, however, is that a reasonably high yield of low HMX-content RDX is produced for special purpose applications and the remaining high HMX-containing RDX can be employed in other applications. FIG. 10 shows the typical crystals that formed from these tests.

Experiments performed using $\gamma$-Butyrolactone or DMSO as the solvent gave results that were similar to those of the first stage expansion of acetone solutions, i.e., the particles formed were rather thick chunks and the HMX content of RDX had been reduced significantly. However, since the second stage expansion was so rapid and to a much higher expansion level, there is a higher HMX content than desired in the solid sample. The starting solution for the second stage had a higher ratio of HMX to RDX than for the first stage (it being the spent solution from the first expansion); this factor could also have contributed to the precipitation of HMX during the second stage. Table 3 gives data pertaining to HMX content for two of the two-stage experiments. The spent solutions are indicated with an "s"; the solvent was evaporated in order to determine the ratio of solids remaining in solution (Refer to FIG. 9 for clarification).

Sample 4 contains a fairly high amount of HMX. A multistage expansion might prevent concomitant HMX and RDX recrystallization and, in fact, this procedure is currently being investigated. To give an idea of the expansion levels tested, the first-stage expansion was to ~40% and (by volume) and the second was to ~200%. By performing multiple expansions between 40% and 200% it may be feasible to recover nearly all of the RDX without HMX. However, since ~60–65% of the starting RDX is recovered during the first stage, the ratio of HMX to RDX left in the spent solution may be too high to selectively recrystallize RDX in a further expansion.

TABLE 3

HMX Content of Solid Samples from a Two-stage Expansion

| Starting Solution | Sample | Wt % HMX |
|---|---|---|
| — | Control | 3.16 |
| 10.2% solids in γ-BL | 3 | 0.52 |
|  | 3s | 9.53 |
| spent solution. 3s | 4 | 8.60 |
|  | 4s | 5.09 |
| 20% solids in DMSO | 5 | negligible |
|  | 5s | 5.50 |
| spent solution. 5s | 6 | 1.97 |
|  | 6s | 5.25 |

Figure 11:
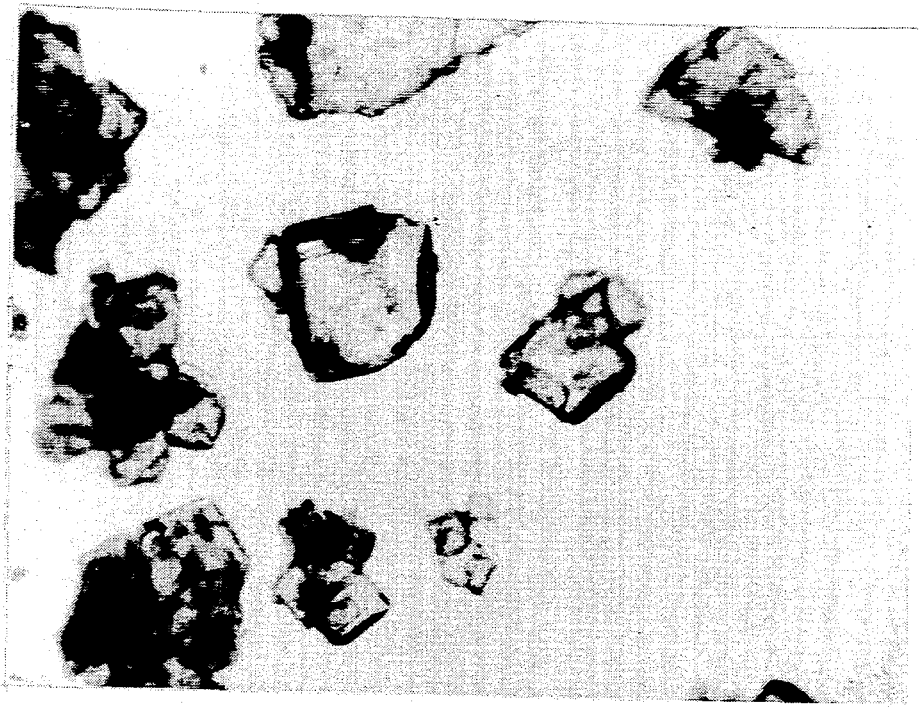
FIG. 11 shows RDX crystals formed form "first stage" expansion of an RDX/ -Butirolactone solution (HMX content is 0.52 by weight).

FIG. 11 shows the crystals obtained from the first stage expansion (i.e., Sample 3) using a 10.2 wt % solution of RDX (plus HMX) in γ-Butyrolactone. The tendency for the "first stage" crystals to exhibit a cubical habit was prevalent when this solvent was used at RDX concentrations of 10–12 wt %.

We claim:

1. A process for separating mixtures of crystalline solids using gaseous, near critical, or supercritical fluids as anti-solvents, comprising the steps of
dissolving a solid mixture containing at least two components which are to be separated in a common liquid solvent to form a solution;
adding to the solution a volume a gaseous, near critical, or supercritical anti-solvent to induce precipitation of one component of the components of the solid mixture resulting in a precipitated component, and collecting the precipitated component.

2. The process of claim 1 wherein the the components of the solution are of similar solubility in the common liquid solvent and thereby are not easily separated by filtration methods or liquid-liquid anti-solvent methods.

3. The process of claim 1 wherein the mixture contains a high percentage of a major component and a low percentage of one or more minor additional components of similar solubility in a common solvent which are not easily separated using simple filtration techniques or liquid-liquid anti-solvent technique.

4. The process of claim 3 wherein a different anti-solvent is used for separating the major component from the mixture and for separating the minor components from each other.

5. The process of claim 3 wherein the major component is reduced in content of the minor component or components by at least 10 fold.

6. The process of claim 3 wherein the major component is RDX and the minor component is HMX.

7. The process of claim 3 wherein the solid mixture is dissolved in the liquid solvent to the point of about 1 to about 100 weight percent of saturation for at least one of the components in the mixture for the particular solvent.

8. The process of claim 7 wherein the minor components are obtained as a solid mixture.

9. The process of claim 1 wherein the mixture contains a high percentage of a major component and a low percentage of one or more minor additional components of dissimilar solubility in a common solvent which are not easily separated using simple filtration techniques or liquid-liquid anti-solvent technique.

10. The process of claim 9 wherein the solid mixture is dissolved in the liquid solvent to the point of about 1 to about 100 weight percent of saturation for at least one of the components in the mixture for the particular solvent.

11. The process of claim 10 wherein the minor components are obtained as a solid mixture.

12. The process of claim 9 wherein the liquid solvent is any organic solvent or mixture of organic solvents capable of dissolving the mixed solids.

13. The process of claim 9 wherein the major component is reduced in content of the minor component or components by at least 10 fold.

14. The process of claim 9 wherein the major component is RDX and the minor component is HMX.

15. The process of claims 1 wherein the mixture of crystalline solids contain components selected from the group consisting of a pharmamaceutical, a pharmaceutical precursor, and an explosive.

16. The process according to claim 5 wherein the explosive is selected from the group consisting of RDX, HMX, and mixtures thereof.

17. The process of claim 5 wherein the mixture contains RDX and HMX.

18. The process of claim 1 wherein the anti-solvent is gaseous, near-critical, or supercritical carbon dioxide.

19. The process of claim 1 wherein the anti-solvent is selected from the group consisting of methane, ethane, ethylene, propane, butane, nitrous oxide, nitrogen, dimethyl ether, isobutanes, propylene, chlorotrifluoromethane, dichlorodifluoromethane, chlorodifluoroethane, dichlorodifluoroethane, sulfur hexafluoride, hexafluoroethane, carbon tetrafluoride, and mixtures thereof.

20. The process of claim 1 wherein the anti-solvent is $SO_3$.

21. The process of claim 1 wherein the liquid solvent is any organic solvent or mixture of organic solvents capable of dissolving the mixed solids.

22. The process of claim 1 wherein the liquid solvent is sulfuric acid.

23. The process as set forth in claim 1 wherein the precipitated component is collected by filtering the solution.

24. The process as set forth in claim 1 wherein the solid mixture contains more than two components and the process steps are repeated at least once to induce precipitation of at least a second component of the more than two components of the mixture.

25. The process of claim 1 wherein the common solvent is selected from the group consisting of acetone gamma-butyrolactone and dimethyl sulfoxide.

26. A process for separating mixtures of crystalline solids using gaseous, near critical, or supercritical fluids as anti-solvents, comprised of the steps of
dissolving a solid mixture containing at least two components which are to be separated in a liquid solvent to form a solution, the solid mixture being comprised of a major component and at least one minor component, the major component and at least one minor component having similar solubilities in the liquid solvent;
adding to the solution a volume of a gaseous, near critical or supercritical anti-solvent to induce precipitation of one component of at least two components of the solid mixture resulting in a precipitated component; and collecting the precipitated component resulting in a reduction of the major component in the liquid solvent by at least tenfold.

27. The process according to claim 26 wherein in addition to the anti-solvent, which is a first anti-solvent, a second anti-solvent is used to separate the minor components from each other, the second anti-solvent being different from the anti-solvent.

28. The process according to claim 27 wherein the first anti-solvent and second anti-solvent are selected from the group consisting of methane, ethane, ethylene, propane, butane, nitrous oxide, nitrogen, dimethyl ether, isobutanes, propylene, chlorotrifluoromethane, dichlorodifluoromethane, chlorodifluoroethane, sulfur hexafluoride, hexafluoroethane, carbon tetrafluoride, and mixtures thereof.

29. The process according to claim 26 wherein the anti-solvent is $SO_3$.

30. The process according to claim 26 wherein the liquid solvent is sulfuric acid.

31. The process according to claim 26 wherein the anti-solvent is selected from the group consisting of methane, ethane, ethylene, propane, butane, nitrous oxide, nitrogen, dimethyl ether, isobutanes, propylene, chlorotrifluoromethane, dichlorodifluoromethane, chlorodifluoroethane, sulfur hexafluoride, hexafluoroethane, carbon tetrafluoride, and mixtures thereof.

32. A process for separating mixtures of crystalline solids using gaseous, near critical, or supercritical fluids as anti-solvents, comprising the steps of
dissolving a solid mixture containing at least two components which are to be separated in a liquid solvent to form a solution, the solid mixture being comprised of a major component and at least one minor component, the major component and at least one minor component have dissimilar solubility;
adding to the solution a volume of a gaseous near critical or supercritical anti-solvent to induce precipitation of one component of the solid mixture resulting in a precipitated component; and
collecting the precipitated component resulting in a reduction of the major component in the liquid solvent by at least tenfold.

33. The process according to claim 32 wherein the anti-solvent is $SO_3$.

34. The process according to claim 32 wherein the liquid solvent is sulfuric acid.

35. The process according to claim 32 wherein the anti-solvent is selected from the group consisting of methane, ethane, ethylene, propane, butane, nitrous oxide, nitrogen, dimethyl ether, isobutanes, propylene, chlorotrifluoromethane, dichlorodifluoromethane, chlorodifluoroethane, sulfur hexafluoride, hexafluoroethane, carbon tetrafluoride, and mixtures thereof.

36. The process according to claim 32 wherein a second anti-solvent is used to separate the minor components from each other, the second anti-solvent is different from the anti-solvent.

* * * * *